April 25, 1944.  J. A. FORBES  2,347,599
BRAKE
Filed Jan. 16, 1942
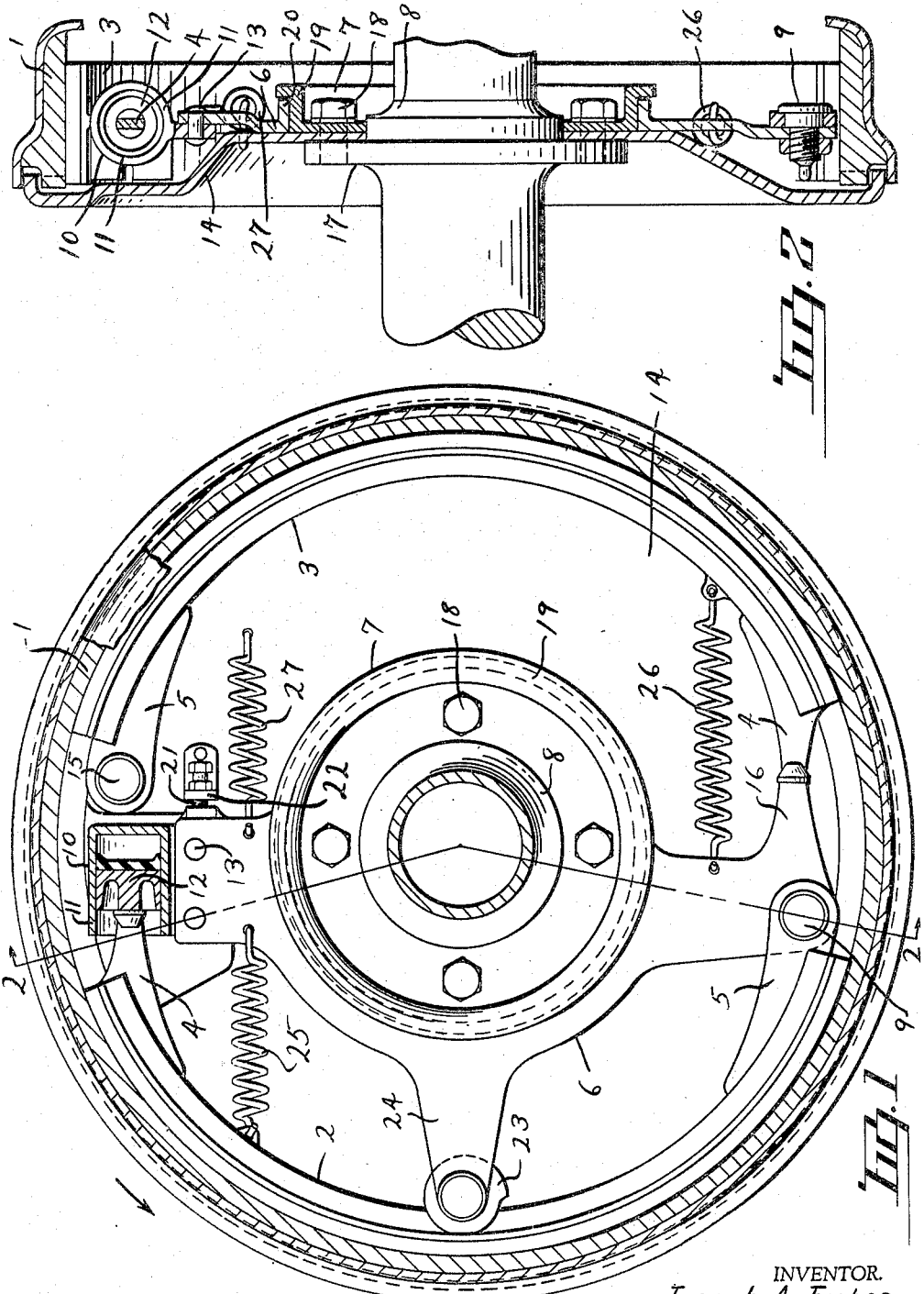
INVENTOR.
Joseph A. Forbes
BY Whittemore Hulbert & Belknap
Attorneys Patented Apr. 25, 1944

2,347,599

UNITED STATES PATENT OFFICE 2,347,599

BRAKE

Joseph A. Forbes, Detroit, Mich., assignor to Kelsey-Hayes Wheel Company, Detroit, Mich., a corporation of Delaware Application January 16, 1942, Serial No. 427,054

6 Claims. (Cl. 188—152)

The invention relates to brakes and refers more particularly to brakes for vehicle wheels.

The invention has for one of its objects to provide an improved brake which is effective in operation, requires relatively low foot pedal pressure, and is controllable.

The invention has for other objects to provide a brake in which the actuator for applying the brake has parts which are relatively movable through a relatively short distance and to provide a brake in which the actuator is a fluid pressure actuated actuator requiring but little braking fluid for its operation.

The invention has for further objects the novel features of construction and combinations and arrangements of parts as more fully hereinafter set forth.

In the drawing:

Figure 1 is an elevation, partly in section, of a brake embodying the invention;

Figure 2 is a cross section on the line 2—2 of Figure 1.

The brake, as shown, is for use with a motor vehicle wheel, but it is apparent that it may be used with airplane landing wheels, as well as other wheels.

The brake comprises the brake drum 1, the friction elements 2 and 3 within and engageable with the brake drum, and suitable means for moving the friction elements against the brake drum. The friction elements 2 and 3 are arcuate brake shoes preferably of T-section and provided with the usual brake linings for frictionally engaging the annular flange of the brake drum. The shoes are alike and interchangeable and each has at one end the projection 4 and at the other end the projection 5. The brake drum during the forward movement of the motor vehicle is adapted to rotate in the direction indicated by the arrow in Figure 1 so that the shoes 2 and 3 are respectively the primary and secondary shoes of the brake.

The shoe 2 is mounted on and carried by the mounting member 6 which is journaled midway between its ends on the annular bracket 7 which is concentric with and secured to the wheel hub 8. The mounting member extends generally diametrically of the brake drum and its lower end is pivotally connected to the primary shoe 2 by means of the adjustable eccentric pivot 9 which extends through the projection 5. The mounting member carries the fluid pressure operated actuator 10 at its upper end and this actuator comprises the cylinder 11 and the piston 12, the cylinder being rigidly secured to the upper end of the mounting member by the rivets 13 and the piston being reciprocable in the cylinder and operatively connected to the upper end of the primary shoe 2 as by abutting the projection 4.

The shoe 3 is pivotally anchored at its upper end to the fixed support or backing plate 14 by means of the adjustable eccentric pivot 15 extending through the fixed support or backing plate and the projection 5 at the upper end of the shoe. The lower end of the shoe is operatively connected to the mounting member 6 by its projection 4 abutting the lateral projection 16 at the lower end of the mounting member on the edge opposite the shoe 2.

Both the fixed support or backing plate 14 and the annular bracket 7 are secured to the fixed flange 17 of the wheel hub 8 and in concentric relation to the latter by the bolts 18. The annular bracket is formed with the annular flange 19 and cooperates with the fixed support or backing plate to form an annular groove for receiving the central annular flange 20 of the mounting member 6 whereby the latter is axially positioned.

21 is a stop in the nature of an adjustable set screw threadedly engaging the lug 22 on the fixed support or backing plate and engageable with the upper edge portion of the mounting member 6 opposite the shoe 2. 23 is another adjustable stop in the nature of an eccentric adjustably rotatably mounted on the arm 24 which is integral with and extends transversely and radially outwardly from the mounting member midway between its ends. The eccentric is engageable with the axial flange of the shoe 2 substantially midway between its ends. It will be seen that by adjusting the set screw 21 the angular position of the mounting member relative to the fixed support or backing plate can be adjusted and that by adjusting the eccentric pivot 15 the shoe 3 can be positioned relative to the brake drum to effect centering of the shoe in the brake drum. Also, that by adjusting the eccentric pivot 9 and the eccentric 23 the shoe 2 can be adjustably positioned in the brake drum to be centered with respect thereto.

The coil springs 25 and 26 between the mounting member and the free ends of the shoes 2 and 3 and the coil spring 27 between the mounting member and the fixed support or backing plate resiliently hold the parts in their inoperative or off positions.

Assuming the parts to be in their inoperative or off positions and the brake drum to be rotating in the direction of the arrow, as shown in Figure 1, and braking fluid or, more particularly, braking liquid to be forced into the chamber formed by the piston and cylinder members of the actuator 10, the leading end of the shoe 2 is moved against the brake drum 1 by movement of the piston 12 away from the closed end of the cylinder 11. As soon as the leading end of the shoe 2 engages the brake drum the shoe wraps into full contact with the brake drum and moves circumferentially therewith in the direction indicated by the arrow in Figure 1, thereby swinging the mounting member 6 so that both its lower and upper ends move in a counterclockwise direction. It is apparent that the force swinging the mounting member equals the force exerted by the piston 12, plus the wrapping force or torque exerted by the shoe 2. It is also apparent that the force exerted by the piston 12 only and acting to swing the mounting member in a counterclockwise direction is opposed to and equal to the force exerted on the closed end of the cylinder 11. As a result, the wrapping force or torque only of the shoe 2 is used in forcing the shoe 3 against the brake drum. Also, as a result of this construction, after the piston 12 has been moved in a direction to move the shoe 2 into full contact with the brake drum and a circumferential movement of this shoe occurs, the swinging of the mounting member 6 causes the cylinder 11 to move in the same direction as and at substantially the same rate as the piston 12 to maintain a substantially constant volume irrespective of the pressure exerted by the braking fluid or liquid. Therefore, with this construction but little braking fluid or liquid is required to apply the brake.

What I claim as my invention is:

1. A brake comprising a brake drum, interchangeable friction elements engageable with said drum, a member carrying and pivotally connected to one end of one of said elements, said member being swingable upon circumferential movement of one of said first mentioned elements and being operatively connected to another of said elements at one of its ends to move said last mentioned element into engagement with said drum, a pivotal anchor other than said member for the other end of said last mentioned element, and an actuator on said swingable member engageable with the end of asid first mentioned element other than the pivotally connected end for moving said first mentioned element into engagement with said drum.

2. A brake comprising a brake drum, friction elements engageable with said drum, and means for moving said elements into engagement with said drum comprising a swingable member operatively connected at one end to adjacent ends of said elements, and an actuator mounted on and movable with the other end of said swingable member and comprising relatively movable members simultaneously movable with and at the same rate as the ends of one of said elements.

3. A brake comprising a brake drum, a pair of brake shoes within and engageable with said drum, a swingable member pivoted intermediate its ends and pivotally connected at one of its ends to one of said shoes, said member being operatively connected at said last mentioned end to the other of said shoes, a pivotal mounting for said last mentioned shoe, a fluid pressure operated actuator comprising piston and cylinder members, one of said members being mounted on said swingable member at the end opposite said end pivotally connected to one of said shoes and the other of said members being operatively connected to the other end of said last mentioned shoe.

4. A brake comprising a brake drum, a member pivotally mounted at its middle, a cylinder mounted on one end of said last mentioned member, a piston slidable within said cylinder, a brake shoe engageable with said drum having one end operatively connected to said piston and the other end operatively connected to said swingable member at the end opposite said cylinder, and a second brake shoe engageable with said brake drum having an end operatively connected to the end of said swingable member opposite said cylinder.

5. A brake comprising a brake drum, a pair of friction elements engageable with said drum, a fixed anchor at an end of one of said elements, an actuator having relatively movable actuating members, said actuator being adjacent said anchor and having one of said actuating members operatively connected to an end of the other of said elements, and a swingable member having one part operatively connected to the other ends of said elements and another part operatively connected to the other of said actuating members, said swingable member being movable angularly by the other of said elements and compelling said actuating members to move substantially in unison.

6. A brake comprising a brake drum, an actuator having relatively movable actuating members, a swingable member pivoted intermediate its ends and having one end operatively connected to one of said actuating members, a friction element engageable with said drum and having a part operatively connected to the other of said actuating members and another part operatively connected to the other end of said swingable member, a second friction element engageable with said drum and having a part operatively connected to the last mentioned end of said swingable member, and anchor means for said friction elements comprising an anchor for said second friction element.

JOSEPH A. FORBES.